W. W. PARMENTER.
POWER FRAME.
APPLICATION FILED JULY 23, 1917.
1,269,736.
Patented June 18, 1918.
3 SHEETS—SHEET 1.
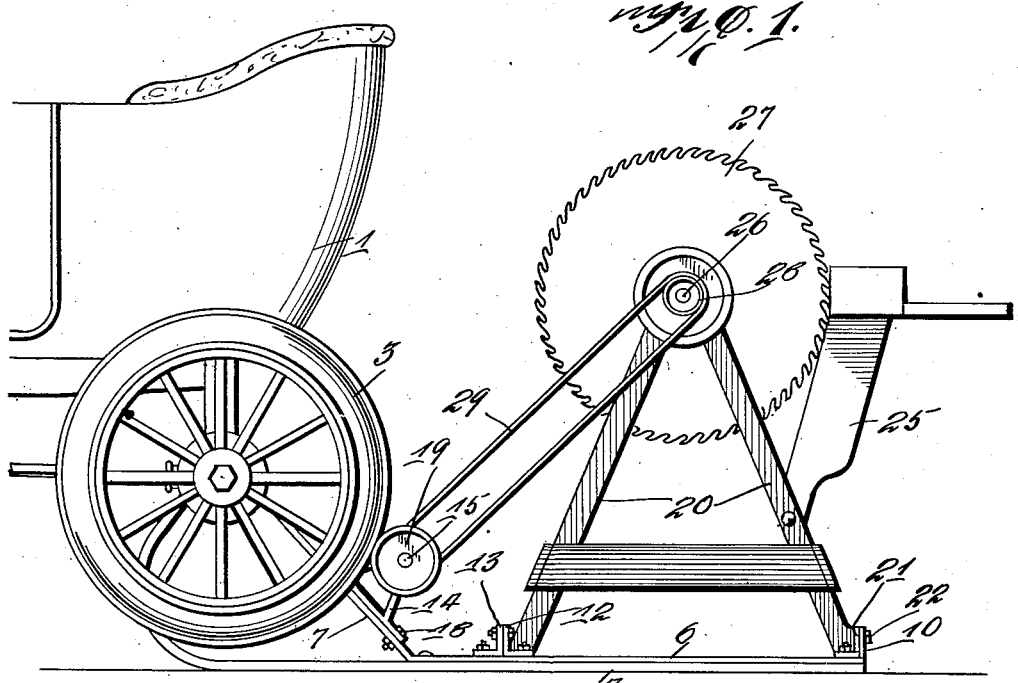
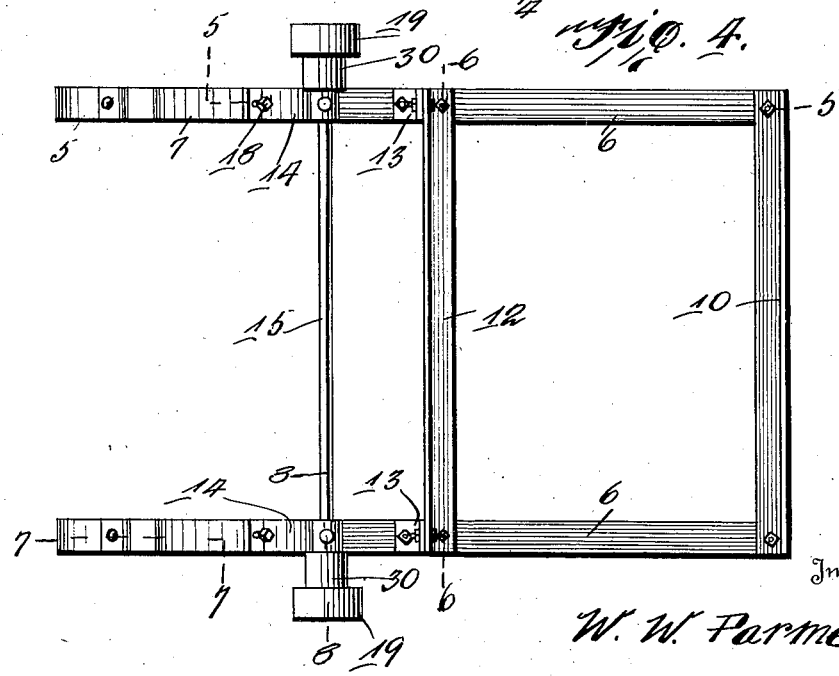
Inventor
W. W. Parmenter
By E. E. Vrooman &co.,
his Attorneys

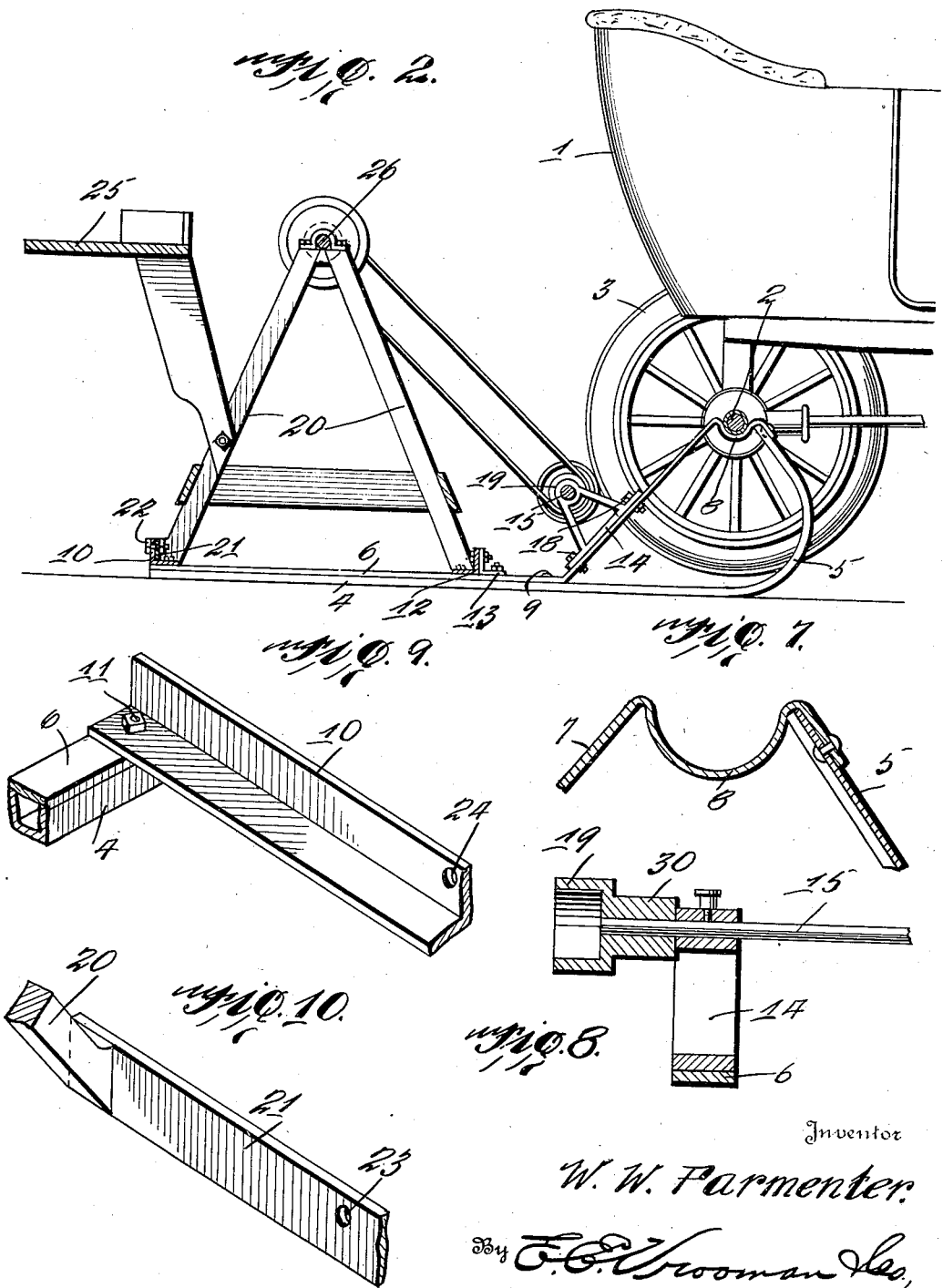

W. W. PARMENTER.
POWER FRAME.
APPLICATION FILED JULY 23, 1917.
1,269,736.
Patented June 18, 1918.
3 SHEETS—SHEET 3.
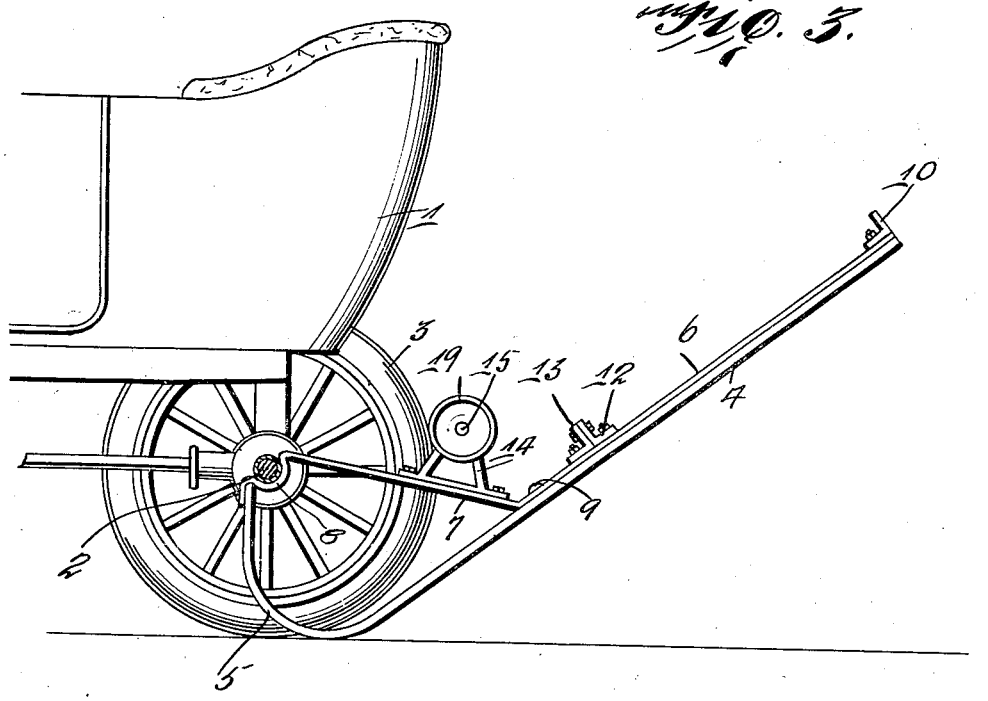
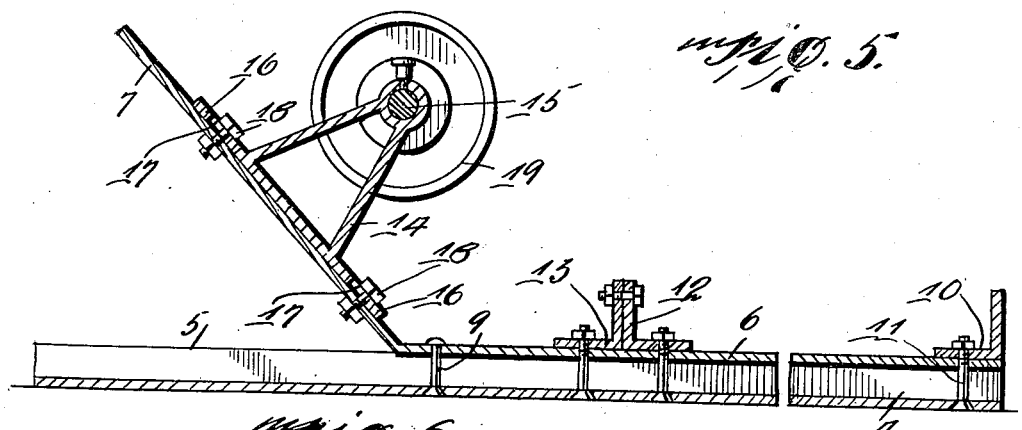
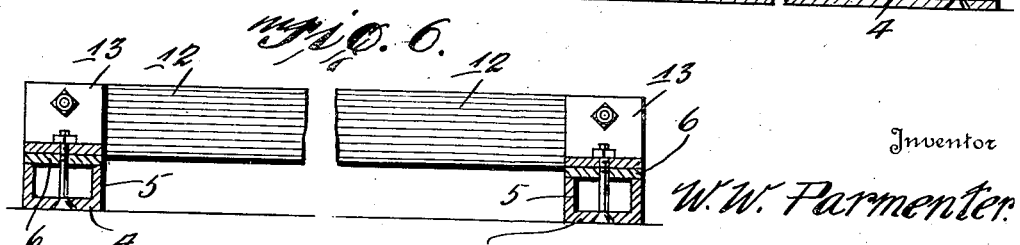
Inventor
W. W. Parmenter.

UNITED STATES PATENT OFFICE.

WILLIAM WESLEY PARMENTER, OF REDFORD, MICHIGAN.

POWER-FRAME.

REISSUED 1,269,736.    Specification of Letters Patent.    Patented June 18, 1918.

Application filed July 23, 1917. Serial No. 182,270.

*To all whom it may concern:*

Be it known that I, WILLIAM W. PARMENTER, a citizen of the United States of America, residing at Redford, in the county of Wayne, and State of Michigan, has invented certain new and useful Improvements in Power-Frames, of which the following is a specification, reference being had therein to the accompanying drawing.

This invention relates to a power frame and has for its object the production of a simple and efficient power frame which is adapted to be used in connection with automobiles or other motor vehicles whereby power may be obtained and transmitted from the rear drive wheels of the motor vehicle.

Another object of this invention is the production of a simple and efficient power frame which is light in construction and upon which may be easily and efficiently attached a saw frame or other machine which is adapted to be driven from the drive wheels of a motor vehicle.

With these and other objects in view, this invention consists of certain novel constructions, combinations and arrangement of parts as will be hereinafter fully described and claimed.

In the drawings:

Figure 1 is a side elevation of the power attachment shown coöperating with the drive wheels of a motor vehicle.

Fig. 2 is a central, longitudinal section of the power frame shown connected to an automobile, the drive axle thereof being shown in section.

Fig. 3 is a side elevation of an automobile, the rear axle being shown in section, the power frame also being shown in a position ready to lift the rear axle and move the drive wheels out of engagement with the ground.

Fig. 4 is a top plan view of the power frame.

Fig. 5 is a section taken on line 5—5 of Fig. 4.

Fig. 6 is a section taken on line 6—6 of Fig. 4.

Fig. 7 is a fragmentary sectional view taken on line 7—7 of Fig. 4.

Fig. 8 is a section taken on line 8—8 of Fig. 4.

Fig. 9 is a detail fragmentary, perspective view of one corner of the power frame.

Fig. 10 is a detail perspective of one corner of the machine frame which is adapted to rest upon an object supported by the power frame.

By referring to the drawings it will be seen that 1 designates the frame of the automobile which is provided with the usual rear drive axle 2. This axle 2 supports the usual rear drive wheels 3.

A power frame is adapted to coöperate with the rear axle 2 of the automobile 1 and this frame comprises a part of bottom runners 4. The runners are of channel iron construction and are provided with upwardly curved forward ends 5 as shown clearly in Figs. 2 and 3.

These runners 4 are adapted to be arranged in spaced, parallel relations, and each runner carries a strap plate 6 upon the top edge thereof as shown clearly in Fig. 6 of the drawings. These strap plates 6 are provided with upwardly inclined forward ends 7 which forward ends are provided with cradle-sockets 8. The extremity of these cradle-sockets 8 overhanging the ends 5 as shown in Fig. 7 and being riveted or otherwise permanently secured to the upper ends of the upturned ends 5. Suitable rivets 9 are employed for firmly holding thereby plates 6 in engagement with the channel irons 4.

An end angle plate 10 is secured to the rear ends of the strap plates 6 by means of the bolts 11 which pass therethrough and which also extend through the channel runners 4. A transversely extending angle plate 12 is secured to the top of the plates 6 and faces angle plate 10 as shown clearly in Figs. 4 and 5 of the drawings, the angle iron 12 is braced by means of the angle braces 13 which engage the rear of the angle plate 12.

A power shaft supporting bracket 14 is carried by the upwardly inclined end 7 of each plate 6 and these brackets 14 support a power shaft 15. Each bracket 14 is provided with laterally extending feet 16 which feet are provided with elongated apertures 17 for receiving securing bolts 18 carried by the ends 7. It should be understood that these brackets 14 may be adjusted to a proper position for holding the friction wheels 19 in proper engagement with the tires of the wheels 3. These friction wheels 19 are carried on the shaft 15 and are adapted to frictionally engage the wheels 3 whereby power may be transmitted through said wheels 19 to the shaft 15 from the wheels 3.

The machine frame 20 is supported upon the power frame and may be of any suitable or desired construction without departing from the spirit of the invention. This machine frame 20 is provided with a plurality of converging, supporting legs which supporting legs are braced at their lower ends by means of the transversely extending plates 21. These plates 21 fit snugly against the angle plates 10 and 12. In order that the power frame may efficiently hold the machine frame against lateral movement, a securing bolt 22 is passed through the aperture 23 formed in one of the plates 21 and through the aperture 24 formed in the angle plate 10. There of course will be very little lateral strain upon the machine frame 20, and this securing bolt 22 will be sufficient to hold the frame 20 against lateral shifting movement.

The frame 20 is provided with a suitable table 25 and a shaft 26 is supported upon the top 20 as shown in Fig. 2 of the drawing. This shaft 26 is adapted to support a saw 27 as shown in Fig. 1, and a drive pulley 28 is also carried by this shaft 26, a suitable drive belt passes over the pulley 28 and also passes over one of the pulleys 30 formed upon one of the friction wheels 19.

When it is desired to operate the saw or other machine mechanism which may be substituted for the saw, a power frame is placed in the position such as is illustrated in Fig. 3 of the drawings in order that the cradle-portion 8 may fit under the axle 2. After the frame has been placed or forced into the position shown in Fig. 3, the outer end of the power frame may be forced downwardly thereby moving and lifting the axle 2 upwardly and relieving the wheels from the ground, this movement is possibly due to the rocking action and leverage which is obtained by the power frame when forcing the same downwardly. The friction wheels 19 may be adjusted into frictional engagement with the wheels 3, and by attaching the machine frame 20 upon the power frame as above described, and placing the belt 29 over the pulleys 28 and 30, power may be transmitted from the drive wheels of the motor vehicle to the shaft 26.

I claim:

1. A power frame of the class described comprising a number of side rails having upturned inner ends, a strap plate carried by said rails and provided with upwardly extending end portions, said end portions provided with a cradle-portion at the upper end thereof, said cradle-portion adapted to fit under the axle of a motor vehicle for supporting the same above its normal level, a power shaft, and friction wheels carried by said power shaft and adapted to frictionally engage the wheels of a motor vehicle with which said device is adapted to be used.

2. A power frame of the class described, comprising a plurality of rails, said rails provided with upwardly curved ends, cradle-portions supported upon the ends of said rails and adapted to fit under the axle of a motor vehicle whereby the axle of a motor vehicle will be lifted as said frame is swung upon said curved ends, a power shaft, friction drive wheels carried by said power shaft and adapted to frictionally engage the drive wheels of a motor vehicle.

3. A power frame of the class described, comprising a plurality of rails, said rails provided with upwardly curved ends, cradle-portions supported upon the ends of said rails and adapted to fit under the axle of a motor vehicle whereby the axle of a motor vehicle will be lifted as said frame is swung upon said curved ends, a power shaft, friction drive wheels carried by said power shaft and adapted to frictionally engage said drive wheels of a motor vehicle, a belt pulley secured to said power shaft a machine frame detachably supported upon said power frame, provided with a rotary member, and means coöperating with said belt pulley for operating said rotary member of said machine frame.

4. A power frame of the class described comprising a plurality of rails, said rails comprising curved forward ends, strap plates carried by said rails and provided with cradle-portions at their upper ends, said strap plates provided with upwardly inclined forward ends, a plurality of brackets detachably mounted upon said inclined ends, a power shaft carried by said brackets, friction wheels carried by said power shaft and adapted to engage the drive wheels of a motor vehicle, a belt pulley secured to said power shaft, a machine frame supported upon said power frame, a machine shaft carried by said machine frame, a pulley carried by said machine shaft, and a belt on said belt pulley of the power shaft and said pulley of the machine shaft.

5. A power frame of the class described comprising a plurality of rails, driving means carried by said rails and adapted to engage the drive wheels of a motor vehicle, a plurality of transversely extending angle irons carried by said rails, and a machine frame seated upon said rails and held between said angle irons.

6. A power frame of the class described comprising a plurality of rails, driving means carried by said rails and adapted to engage the drive wheels of a motor vehicle, a plurality of transversely extending angle irons carried by said rails, a machine frame seated upon said rails and held between said angle irons, said machine frame comprising a plurality of legs, a tie plate connecting some of said legs, and means for anchoring said tie plate to one of the angle irons of said power frame.

7. A power frame of the class described comprising a plurality of rails, driving means carried by said rails and adapted to engage the drive wheels of a motor vehicle, a plurality of transversely extending angle irons carried by said rails, a machine frame seated upon said rails and held between said angle irons, said machine frame comprising a plurality of legs, a tie plate connecting some of said legs, a bolt passing through one of said angle irons and through said tie plate for anchoring said machine frame upon said power frame.

In testimony whereof I hereunto affix my signature.

WILLIAM WESLEY PARMENTER.